United States Patent
Korycki et al.

(10) Patent No.: US 10,360,199 B2
(45) Date of Patent: *Jul. 23, 2019

(54) PARTITIONING AND REBALANCING DATA STORAGE

(71) Applicant: Microsoft Technology Licensing, LLC, Redmond, WA (US)

(72) Inventors: Jacek A. Korycki, San Jose, CA (US); David A. Van Brink, Santa Cruz, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,287

(22) Filed: Jan. 22, 2018

(65) Prior Publication Data

US 2018/0144009 A1 May 24, 2018

Related U.S. Application Data

(63) Continuation of application No. 14/519,952, filed on Oct. 21, 2014, now Pat. No. 9,875,263.

(51) Int. Cl.
*G06F 16/22* (2019.01)
*G06F 16/23* (2019.01)
(Continued)

(52) U.S. Cl.
CPC ......... *G06F 16/2228* (2019.01); *G06F 16/23* (2019.01); *G06F 16/278* (2019.01); *G06F 16/9535* (2019.01)

(58) Field of Classification Search
CPC ......... G06F 17/30321; G06F 17/30345; G06F 17/30584; G06F 17/30867; G06F 16/2228; G06F 16/9535; G06F 16/23; G06F 16/278

See application file for complete search history.

(56) References Cited

U.S. PATENT DOCUMENTS 6,125,370 A * 9/2000 Courter ............ G06F 17/30312
6,269,375 B1 * 7/2001 Ruddy ............ G06F 17/30339
(Continued)

FOREIGN PATENT DOCUMENTS

CN 101916261 12/2010
RU 2386997 C2 4/2010
(Continued)

OTHER PUBLICATIONS

"International Preliminary Report on Patentability", Application No. PCT/US2015/055413, dated Jan. 26, 2017, 7 pages.
(Continued)

*Primary Examiner* — Jorge A Casanova
(74) *Attorney, Agent, or Firm* — NovoTechIP International PLLC

(57) ABSTRACT

Techniques are described for partitioning and rebalancing data storage, such as through management of database partitions. In one or more implementations, a database that includes existing partitions is repartitioned to include new partitions. A balancing function that uses a skew factor is implemented that skews new data allocation to the new partitions. In at least some implementations, the skew factor can be removed from new data allocation, such as in response to an indication that data allocation between the new partitions and the existing partitions is unbalanced.

20 Claims, 8 Drawing Sheets

(51) Int. Cl.
*G06F 16/27* (2019.01)
*G06F 16/9535* (2019.01)

(56) References Cited

U.S. PATENT DOCUMENTS

| | | | |
|---|---|---|---|
| 7,080,101 | B1 | 7/2006 | Watson |
| 8,078,825 | B2 | 12/2011 | Oreland et al. |
| 8,341,376 | B1 | 12/2012 | Blackwell et al. |
| 8,554,762 | B1 | 10/2013 | O'Neill et al. |
| 2003/0158884 | A1* | 8/2003 | Alford, Jr. ............ G06F 9/5061 718/104 |
| 2004/0172422 | A1* | 9/2004 | Putzolu ............. G06F 17/30575 |
| 2006/0206507 | A1* | 9/2006 | Dahbour ........... G06F 17/30604 |
| 2009/0157776 | A1 | 6/2009 | McGarvey |
| 2010/0312749 | A1 | 12/2010 | Brahmadesam et al. |
| 2012/0084287 | A1 | 4/2012 | Lakshminarayan et al. |
| 2014/0032614 | A1 | 1/2014 | Gao et al. |
| 2014/0108415 | A1 | 4/2014 | Bulkowski et al. |
| 2014/0156666 | A1 | 6/2014 | Jagtiani et al. |
| 2015/0309999 | A1* | 10/2015 | Ng .................... G06F 17/30598 707/809 |
| 2016/0110391 | A1 | 4/2016 | Korycki et al. |

FOREIGN PATENT DOCUMENTS

| | | | |
|---|---|---|---|
| WO | 2011053595 | A1 | 5/2011 |
| WO | 2011153242 | A1 | 12/2011 |

OTHER PUBLICATIONS

"International Search Report and Written Opinion", Application No. PCT/US2015/055413, dated Jan. 11, 2016, 12 Pages.

"Non-Final Office Action", U.S. Appl. No. 14/519,952, dated Mar. 22, 2017, 8 pages.

"Non-Final Office Action", U.S. Appl. No. 14/519,952, dated Nov. 4, 2016, 7 pages.

"Notice of Allowance", U.S. Appl. No. 14/519,952, dated Sep. 12, 2017, 5 pages.

"Playing with Database Servers", Retrieved From: <http://sqltimes.wordpress.com/2013/10/13/sql-server-table-partitioning-how-to-split-a-partition-with-data-without-causing-any-data-movement/> Jul. 18, 2014, Oct. 13, 2013, 3 Pages.

"Second Written Opinion", Application No. PCT/US2015/055413, dated Sep. 5, 2016, 5 pages.

Huang,"A Multi-Partitioning Approach to Building Fast and Accurate Counting Bloom Filters", In Proceedings: IEEE 27th International Symposium on Parallel & Distributed Processing, May 20, 2013, 12 Pages.

Kanizoa,"Access-Efficient Balanced Bloom Filters", In Proceedings: IEEE International Conference on Communications, Jun. 10, 2012, 36 Pages.

Lee,"Oracle Hash Partition", Retrieved From: <http://www.databaseskill.com/2510356/> Jul. 18, 2014, Nov. 2, 2011, 3 Pages.

McArthur,"Best Practices for Tuning DB2 UDB v8.1 and its Databases", Retrieved From: <http://www.ibm.com/developerworks/data/library/techarticle/dm-0404mcarthur/> Jul. 18, 2014, 4/1/20014, 35 Pages.

Mistry,"Administering Storage, I/O, and Partitioning in Microsoft SQL Server 2012", Retrieved From: <http://www.informit.com/articles/article.aspx?p=1946159&seqNum=5> Jul. 18, 2014, Sep. 27, 2012, 9 pages.

"Office Action Issued in Russian Patent Application No. 2017113620", dated Apr. 22, 2019, 10 Pages.(W/o English Translation).

* cited by examiner

700

702
Establish a record of identifiers for data corresponding to a first partition function associated with a first arrangement of one or more partitions for a database

704
Reconfigure the arrangement of partitions for the database to add at least one additional partition to increase storage capacity in a reconfigured arrangement

706
Generate a composite partition function that combines the first partition function associated with a first arrangement and a second partition function associated with the reconfigured arrangement, the composite partition function configured to use the record of identifiers to ascertain whether to apply the first partition function or the second partition function for routing of data requests between the partitions for the database

708
Route data requests using the composite partition function

*Fig. 7*

PARTITIONING AND REBALANCING DATA STORAGE

RELATED APPLICATIONS

This application is a continuation of and claims priority to U.S. patent application Ser. No. 14/519,952 entitled "Composite Partition Functions" and filed Oct. 21, 2014, the disclosure of which is incorporated by reference herein in its entirety.

BACKGROUND

Users are increasingly relying upon cloud-based resources for online activities such as conducting business and personal communications, online meetings, screen-sharing, video chats, messaging, and otherwise using various resources available from service providers. Various application and user data associated with user interactions may be maintained in databases associated with the resources. Generally, a database may include many different individual partitions or database nodes to which data is allocated. The partitions may be spread across multiple different physical devices and servers. Data entries may be associated with identifiers such as key values that indicate which of the partitions corresponds to the data. The identifiers may be used to allocate and reference the data to perform operations such as adding, accessing, and modifying corresponding data entries.

Over time, the amount of data stored in a database grows and at some point the storage capacity may be expanded to accommodate the volume of data and requests. One traditional database expansion approach involves stopping services for and/or access to the database, adding new storage/partitions to the database, and then reallocating all of the pre-existing data across the new arrangement of partitions. In this approach, pre-existing data is moved to new locations and this moving process may be quite time consuming for large scale databases. As such, traditional database expansion techniques may be quite disruptive to services provided to users and take a considerable amount of time to process and re-insert data at new locations in the updated arrangement of partitions.

SUMMARY

Techniques are described for partitioning and rebalancing data storage, such as through management of database partitions. In one or more implementations, a database that includes existing partitions is repartitioned to include new partitions. A balancing function that uses a skew factor is implemented that skews new data allocation to the new partitions. In at least some implementations, the skew factor can be removed from new data allocation, such as in response to an indication that data allocation between the new partitions and the existing partitions is unbalanced.

Composite partition function techniques are described herein that may be used to repartition a database without moving existing data. In one or more implementations, a database is partitioned in a first arrangement associated with a first partition function. The database is repartitioned to form a second arrangement associated with a second partition function. A record of key membership for data entries in the partitions existing at the time of repartitioning is created, which can be used to recognize data corresponding to the first arrangement. In one approach, the record of key membership is configured as a Bloom filter that compactly represents keys or other identifiers associated with the first arrangement of partitions. A composite partition function that incorporates the first partition function and the second partition function is defined and used for subsequent database operations in the second arrangement. The composite partition function is configured to apply the first partition function for data having keys found in the record of key membership and apply the second partition function for other data having keys that are not found in the record of key membership. The repartitioning is performed such that data entries existing at the time of repartitioning keep their respective locations in partitions of the first arrangement.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

FIG. 7 is a flow diagram depicting an example procedure in which a composite partition function is used to route requests for an arrangement of partitions in accordance with one or more implementations.

DETAILED DESCRIPTION

Overview

Figure 1:
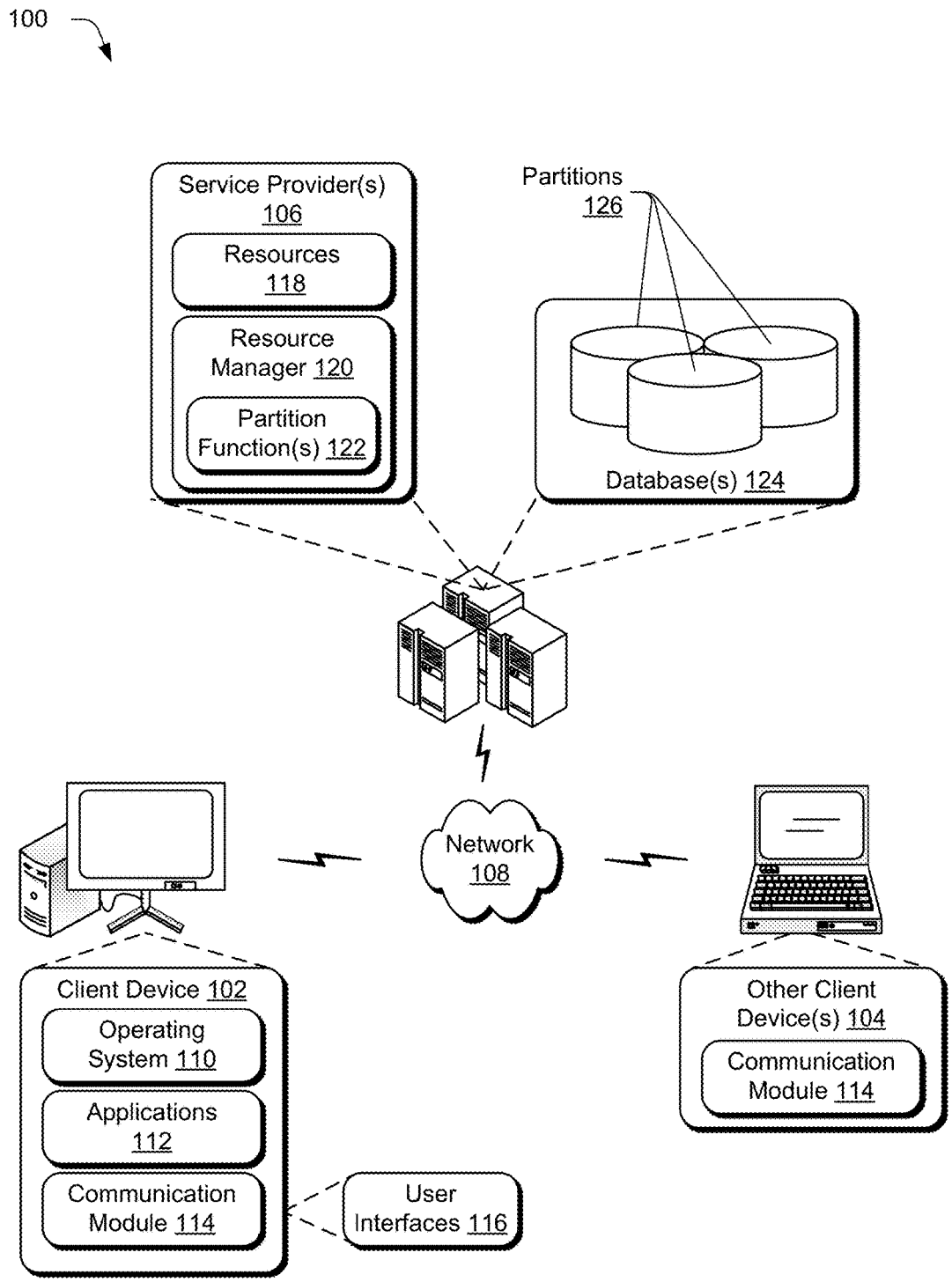
FIG. 1 is an illustration of an example operating environment that is operable to employ techniques for composite partition functions.

Over time, the amount of data stored in a database may grow and at some point the storage capacity may be expanded to accommodate the volume of data and requests. One traditional database expansion approach involves shutting down the database to create new partitions and distributing all of the pre-existing data across the new arrangement of partitions, which is time consuming and disruptive to users.

Composite partition function techniques are described herein that may be used to repartition a database without moving existing data. In one or more implementations, a database is partitioned in a first arrangement associated with a first partition function. The database is repartitioned to form a second arrangement associated with a second partition function. A record of key membership for data entries in the partitions existing at the time of repartitioning is created, which can be used to recognize data corresponding to the first arrangement. In one approach, the record of key membership is configured as a Bloom filter that compactly represents keys or other identifiers associated with the first arrangement of partitions. A composite partition function that incorporates the first partition function and the second partition function is defined and used for subsequent database operations in the second arrangement. The composite partition function is configured to apply the first partition function for data having keys found in the record of key membership and apply the second partition function for other data having keys that are not found in the record of key membership. The repartitioning is performed such that data entries existing at the time of repartitioning keep their respective locations in partitions of the first arrangement.

Using composite partition function techniques as described herein, it is possible to maintain existing data in their respective location within an arrangement of partitions during repartitioning of a database. As such, large quantities of data do not have to be moved which reduces an amount of time associated with repartitioning. Moreover, using a Bloom filter or other compressed representation of key membership enables quick assessments to distinguish between data associated with different partition arrangements (e.g., partition eras) and select the correct partition functions for management of data requests. Further, the record of key membership is configured to have a relatively small size that makes the record manageable and distribution of the record for use by different servers, partitions, and components of the database system feasible.

In the following discussion, an example environment is first described that may employ the techniques described herein. Example details and procedures are then described which may be implemented in the example environment as well as other environments. Consequently, the example details and procedures are not limited to the example environment and the example environment is not limited to the example details and procedures. Lastly, an example system and components of the system are discussed that may be employed to implement aspects of the techniques described herein.

EXAMPLE ENVIRONMENT

FIG. 1 is an illustration of an environment 100 in an example implementation that is operable to employ techniques described herein. The illustrated environment 100 includes a client device 102, an other client device 104, and a service provider 106 that are communicatively coupled via a network 108. The client device 102, other client device 104, and service provider 106 may be implemented by one or more computing devices and also may be representative of one or more entities.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, handheld game consoles). Additionally, although a single computing device is shown in some instances, the computing device may be representative of a plurality of different devices, such as multiple servers of the service provider 106 utilized by a business to perform operations, and so on. Further examples of computing systems and devices suitable to implement techniques described herein are described below in relation to FIG. 8.

Although the network 108 is illustrated as the Internet, the network may assume a wide variety of configurations. For example, the network 108 may include a wide area network (WAN), a local area network (LAN), a wireless network, a public telephone network, an intranet, a peer-to-peer network, and so on. Further, although a single network 108 is shown, the network 108 may be configured to include multiple networks.

The client device 102 is further illustrated as including an operating system 110. The operating system 110 is configured to abstract underlying functionality of the underlying device to applications 112 that are executable on the client device 102. For example, the operating system 110 may abstract processing, memory, network, and/or display functionality such that the applications 112 may be written without knowing "how" this underlying functionality is implemented. The applications 112, for instance, may provide data to the operating system 110 to be rendered and displayed by a display device as illustrated without understanding how this rendering will be performed. A variety of applications 112 typically associated with client devices are contemplated including, but not limited to, a productivity suite that integrates multiple office productivity modules, a web browser, games, a multi-media player, a word processor, a spreadsheet program, a photo manager, and so forth.

The client device 102 and other client device are each illustrated as including a communication module 114. The communication modules are representative of functionality to enable various kinds of communications via the network 108. Examples of the communication modules include a voice communication application (e.g., a VoIP client), a video communication application, a messaging application, a content sharing application, a browser to access web content and combinations thereof. The communication module 114 for instance, enables different communication modalities to be combined to provide diverse communication scenarios. This includes but is not limited to implementing integrated functionality for user presence indications, video communications, online collaboration and meeting experiences, instant messaging (IM), and voice calling. Further, the communication module may be operable to access online resources (e.g., content and services), browse web pages and sites, establish communication connections with service providers and other clients, and enable various other interactions through user interfaces 116 that may be output via the communication modules. In at least some implementations, the communication module 114 represents an application that is deployed to and installed locally on a client device. Additionally or alternatively, the communication module 114 may be implemented all or in part as a remote application that is accessed and executed via a web browser (e.g., a web application), as a remote service from a provider, using peer-to-peer techniques, and so forth.

The service provider 106 includes functionality operable to manage various resources 118 that may be made available over the network 108, such as via a resource manager 120 as depicted in FIG. 1. The resource manager 120 represents various functionality to manage the resources 118 and data related to the resources as discussed herein. The service provider 106 may provide various resources 118 via webpages or other user interfaces 116 that are communicated over the network for output by one or more clients via a web browser or other client application. The service provider 106 is configured to manage access to the resources 118, performance of the resources, and configuration of user interfaces 116 to provide the resources 122, and so on. The service provider 106 may represent one or more server devices used to provide the various resources 118.

Additionally, the resource manager 120 may be configured to implement partition functions 122 to manage databases 124 associated with the resources 118 that may partitioned and repartitioned into a plurality of partitions 126 (also referred as shards). In general, a partition function is configured define how data is allocated across an arrangement of partitions and may also be used to route data requests to appropriate partitions. At least some of the partition functions 122 may be composite partition functions that are configured and operate in the manner described above and below. Additional details regarding formation and use of composite partition functions can be found in relation to the following figures.

In at least some embodiments, clients may access the resources 118 provided by a service provider 106 through client/user accounts to which the clients are authenticated. For instance, to access resources 118, a client device may provide a username and password that are authenticated by an authentication service. When the authentication is successful (e.g., the client "is who they say they are"), the authentication service may pass a token (or other suitable authentication identifier/secret) to enable access to corresponding resources. A single authentication may correspond to one or more resources, such that authentication to a single account by a "single sign-on" may provide access to individual resources, resources from multiple service providers 106, and/or to an entire suite of resources available from a service provider 106.

Generally, resources 118 made accessible by a service provider 106 may include any suitable combination of services and/or content typically made available over a network by one or more providers. Some examples of services include, but are not limited to, a search service, an email service, an instant messaging service, an online productivity suite, a collaboration service (e.g., a service that integrates functionality for one or more of VoIP calls, online meeting and conferencing, screen sharing, a unified communications and collaboration (UC&C) service, instant messaging, video chats, voice communication, and so forth) and an authentication service to control access of clients to the resources 118. Content may include various combinations of text, multi-media streams, documents, application files, photos, audio/video files animations, images, web pages, web applications, device applications, content for display by a browser or other client application, and the like.

Having considered the foregoing example environment, consider now a discussion of some example details and procedures for composite partition function techniques in accordance with one or more implementations.

Composite Partition Function Details

This section discusses details of composite partition function techniques and example procedures that may be used to repartition a database without moving existing data in accordance with one or more implementations. Generally speaking, partitioning is a technique that may be used for scaling databases. Partitioning may involve splitting of records/data entries into disjoint subsets called partitions 126 (also referred to as shards). The partitioning may be based upon suitable identifiers for the records, one example of which is primary keys of the records. Partitions may be physically distributed across multiple different servers and/or storage devices (e.g., database nodes). In one approach, each partition may be assigned to a separate database server such that there is a one to one mapping between partitions and database nodes. In addition or alternatively, one or more partitions may be logically divided across servers/storage devices such that space allocated for a given partition may be located on two or more individual database nodes.

In this context, a given arrangement of partitions has a finite amount of storage capacity which is consumed as the database is populated with data. At some point in time, a capacity threshold may be reached at which the storage capacity may have to be expanded to make continued operation of the database possible. Expansion of the database may involve adding one or more partitions to an existing arrangement of partitions to create another arrangement of partitions with more storage capacity. Expansion of the database is also referred to herein as repartitioning. Repartitioning may occur for a balanced system in which each database node is becoming equally saturated, either with respect to the volume of data stored or rate of requests for access to the data. In this case, additional storage (e.g., another server/storage device) may be added with a new partition function configured to take advantage of the additional storage. Repartitioning may also occur for an unevenly balanced system in which some database nodes are near storage limits, while other nodes are lightly loaded and have room to spare. In this situation the database nodes may remain the same, but a new partition function may be defined that is configured to favor the less utilized nodes over the more loaded nodes.

In accordance with techniques described herein, repartitioning may be performed such that data entries located in partitions existing at the time of repartitioning keep their respective locations. In other words, data already in the database at the time of repartitioning is not moved as a result of the repartitioning, which results in reduced processing time and resource utilization. This may be accomplished by using a composite partition function as discussed herein that is configured to selectively apply multiple different underlying partition functions corresponding to successive arrangements of the partitions or "partition eras," for handling of data requests. In order to do so, the composite partition function may include or otherwise make use of records of key membership to recognize partition eras to which each data request corresponds and apply an appropriate partition function for the partition era that is recognized to handle the request.

Figure 2:
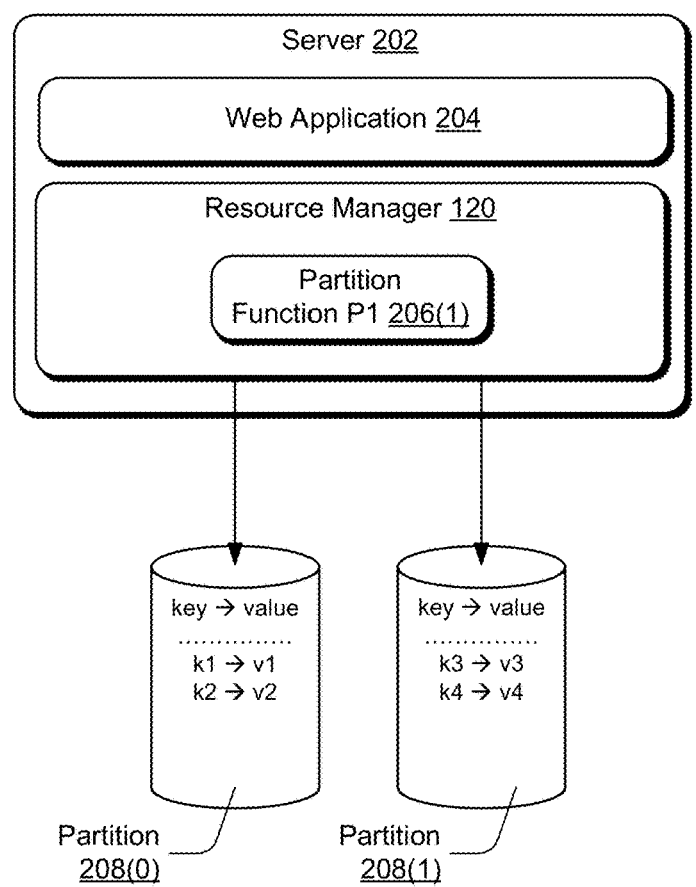
FIG. 2 depicts an example arrangement of partitions for a database system in accordance with one or more implementations.

Consider now the examples of FIGS. 2-5, which illustrate further details and concepts regarding composite partition functions and key membership records, as well as repartitioning using composite partition functions. In particular, FIG. 2 depicts generally at 200 an example arrangement of partitions for a database system in accordance with one or more implementations. In the illustrated example, a server 202 is represented that may be associated with a service provider 106 as discussed in relation to FIG. 1. The server 202 may be configured to provide functionality associated with a web application 204 and/or other resources 118. The server 202 also includes a resource manager 120 that may operate as discussed herein to manage interactions with the web application 204 and storage of data associated with the web application in a corresponding database. The data may be stored via storage devices on which partitions 126 for the database are defined and that may be implemented via one or more servers, which may or may not include the server 202. In an implementation, one or more of the partitions 126 for a database may be provided via the server 202.

The resource manager 120 in the depicted example is configured to implement a partition function p1 206(1) for the arrangement of partitions depicted in FIG. 2, which includes two example partitions, namely partition 208(0) and partition 208(1). The data is represented in a key-value format, where the key is a primary key of a data record and the value represents the content of the data record. Data requests may be made to access the data and perform operations upon the data including but not limited to adding records, deleting records, modification of the data, read operations, write operations, and so forth. In order to access the data to perform operations, the requesting application uses the key (or other comparable identifier) to locate the database node for a partition corresponding to the indicated key. Once this is done, data may be accessed from the selected node and/or partition in accordance with particular protocols, formats, and/or database technology for the database system, which may be different for different systems.

The partition function p1 206(1) and partition functions 122 in general enable a deterministic selection of partitions based on corresponding keys. In other words, the function consistently selects the same partition for a given key so that the data may be reliably located. Various configurations of partition functions 122 are contemplated. In one approach, the partition functions may be configured as hash functions that when applied to key values for data requests return data identifying partitions of the database corresponding to the key values.

By way of example and not limitation, a partition function p may have the form $p(k)=hash(k) \mod N$, where k is the key, hash is a hashing function and N is a number of partitions for a given arrangement. In this example, the partition function returns a partition number counting from 0 to N−1. The hash function operates to assigns a large integer value to a string (or byte array) representing the key k or other identifying data. The hash functions utilized in this form may be configured to provide a uniform distribution of values. Alternatively, a hash function may be selected/configured to achieve a distribution of values that may be used to skew the placement of data to particular partition (e.g., under-utilized partitions). The modulo function mod N casts the large integer value back into a range of 0 to N−1, which may be used as identifiers for the individual partitions in the arrangement of partitions. Accordingly, the partition function may be designed to distribute data among the database nodes/partitions in accordance with a distribution scheme reflected by the partition function.

In the example of FIG. 2, the partition function p1 206(1) is configured to map records for keys k1 and k2 to the first partition, which is partition 208(0) in this example. In other words, the partition function p1 206(1) evaluated for keys k1 and k2 returns an identifier for partition 208(0), which is the value zero in this case (e.g., $p1(k1)=p1(k2)=0$). Accordingly, data records/values corresponding to keys k1 and k2 may be stored in and accessed from servers/storage associated with the partition 208(0) as represented in FIG. 2. The partition function p1 206(1) is also configured to map records for keys k3 and k4 to the second partition, partition 208(1). Here, the function evaluated for keys k3 and k4 returns an identifier for partition 208(1), which is the value one in this case (e.g., $p1(k3)=p1(k4)=1$). Accordingly, data records/values corresponding to keys k3 and k4 may be stored in and accessed from servers/storage associated with the partition 208(1) as represented in FIG. 2.

Now, if a capacity threshold is reached for the example system shown in FIG. 2, additional capacity may be added by including additional servers/storage and repartitioning the database across the new arrangement of partitions. Consider for example and expansion from N to N'>N, where for example N'=N+1, or N'=2*N. The new arrangement of partitions is governed by a new partition function created to accommodate the additional capacity/partitions. New data may then be allocated to the expanded system using a new partition function, which may have the form $p'(k)=hash(k) \mod N'$ as discussed above. The location of existing data though is governed by the former partition function (e.g. partition function p1 206 (1)) and therefore the new partition function may not reliably locate the existing data since generally the two functions are not aligned (e.g., $p(k) \neq p'(k)$). A traditional solution involves stopping the database service for a period of time, iterating over existing records and performing a remove and re-insert operation according to the new partition function to enable subsequent use of the new partition function. As mentioned previously, this can be quite disruptive and time consuming for databases having a large volume of data and requests.

Composite partition function techniques described herein, though, may be used to repartition a database without moving existing data. In general, the composite partition function uses records of key membership for different partition arrangements to select corresponding partition function to use for a given database operation. In this case, the partition function by which particular data was allocated initially to the database continues to be used for the particular data, even after repartitioning. The records of key membership enable selection of the correct function to apply and the composite partition function is designed to use a combination of two or more individual partition functions that each correspond to a different partition era.

Figure 3:
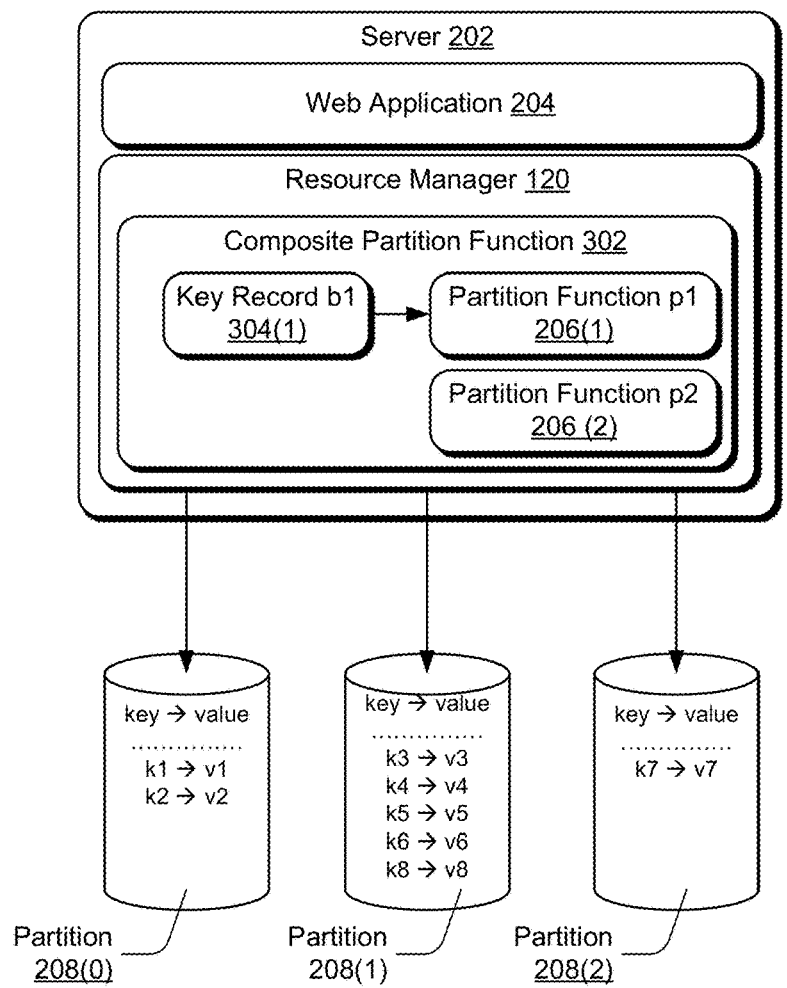
FIG. 3 depicts another example arrangement of partitions for a database system representing an expansion of the system of FIG. 2 in accordance with one or more implementations.

To illustrate, consider FIG. 3 which depicts generally at 300 another example arrangement of partitions for a database system representing an expansion of the system of FIG. 2 in accordance with one or more implementations. In this example, an additional partition 208(2) is depicted as being included in the arrangement of partitions of FIG. 3. Additionally, the resource manager 120 is illustrated as implementing a composite partition function 302 that governs data allocation for the arrangement of partitions of FIG. 3. The composite partition function 302 is configured to combine the former function for the arrangement of FIG. 2, partition function p1 206(1), with a new function, partition function p2 206(2), established for the rearrangement of partitions shown in FIG. 3. The composite partition function 302 is also configured to include or make use of a key record b1 304(1) that may be used to recognize correspondence of key values with the individual partition function incorporated in the composite partition function 302. In one approach, the key record b 1 304(1) provides a mechanism to identify which key values are associated with the former function (partition function p1 206(1)) and therefore select this function for handling of corresponding data requests. The partition function p2 206(2) may be used for other data requests which do not correspond to key values contained in the key record b1 304(1).

In this example, date entries/values associated with keys k1, k3, k3 and k4 are preexisting in the system and are distributed across two partitions as shown in FIG. 2. Repartitioning may occur to add an additional partition as shown in FIG. 3. In implementations, the database system may be stopped to create an additional partition(s) and install the composite partition function. As part of the repartitioning, existing keys in the system (e.g., k1, k2, k3 and k4) are processed to create a records keys membership at the time of repartitioning, which is represented by key record b1 304(1). It is noted that this processing may take significantly less time relative to the amount of time it would take to move the existing records in accordance with the new partition function.

The composite partition function 302 may be defined in the following manner Partition function p1 206(1) is the original partition function for the arrangement of two partitions and may have the form p1 (k)=hash(k) mod 2. Partition function p2 206(2) is the new partition function established for the expanded arrangement of three partitions and may have the form p2(k)=hash(k) mod 3. Now, the composite partition function 302 represented as p'(k) may be expressed as:

$$p'(k)=p1(k) \text{ for any } k \text{ for which } b1(k)=\text{true, or } p'(k)=p2(k) \text{ otherwise.}$$

In other words, a check is made to see if a key value is included in the key record b1 304(1). If the key value is found, p1 is used for handling a corresponding request/operation. Otherwise if the key value is not found, p2 is used for handling a corresponding request/operation. Using the composite partition function 302, existing records can stay in their original locations since they are still located using p1. New records may populate data across the arrangement of partition including the new partition using p2. Consequently, the entire set of database nodes are utilized going forward.

Records of key membership such as the key record b1 304(1) of FIG. 3 may be configured in any suitable way to distinguish between keys associated with different partition arrangements and/or partition eras. Raw lists of keys corresponding to each arrangement/era may be employed in one or more implementations. Practically, though, the size of raw list of keys may make it difficult to distribute the lists to different database servers and nodes and take up a considerable amount memory. Accordingly, a compact representation of keys in a compressed format may be employed in addition or alternatively to using raw lists. A variety of different compressed data structures are contemplated that may be configured to identify keys corresponding to data entries existing in a database at the time of repartitioning. Examples of compressed data structures include but are not limited to a bit map, an arrays, matrices, and filters, to name a few examples.

Another example of a compressed data structure that may suitable for records of key membership in one or more implementations is a Bloom filter. A Bloom filter is a data structure that is designed to remember a set membership for a set of values in a space efficient way. In particular, given a set of keys S={k1, . . . kN}, a Bloom filter may be created to "remember" existence of each key in the set S. Since it is space efficient, the Bloom filter does not merely remember the list of all the keys. Instead, the Bloom filter maintains a bit vector, where for each key k from the set S, a bit is set at index hash(k) mod M, where hash is a hash function (which may or may not differ from hash functions associated with partition functions), and M is the length of the bit vector. In order to determine the set membership of any given key k, a lookup is performed for the bit at position hash(k) mod M. If the bit is set, the key is a member of the set, otherwise it is not. The bit vector is very space efficient, and thus it makes it possible to store the Bloom filter in the memory of database nodes, even for large numbers of keys typically found in databases supporting large applications.

It is noted that Bloom filter is a probabilistic data structure that produces some false positive errors. For example, a key k2 that is not a member of the set S might hash to the same value as the key k1 that is a member of S. This error is known as a collision of the hashing function. The error rate is small, but it is still possible. Accordingly, for a small number of keys that are not members of S, the Bloom filter may incorrectly classify them as set members. The probability of errors may be minimized by extending the length of the bit vector and/or by using multiple hash functions and resolving the membership based on examination of multiple bits settings indicated by these hash functions. Thus, a Bloom filter may be selectively configured to control the error by specifying the length of the bit vector and by choosing one or more hash functions to use for the Bloom filter. In practice, a tradeoff may be made to set an acceptable error rate subject to constraints on storage space consumed by the Bloom filter and latency/cost for computation of the hash functions. The error rate is acceptable since if the Bloom filter misrecognizes a key for new data as being a member of set it will consistently do so. Thus, the data may be reliably located even if it is placed using a former partition function. Moreover, the Bloom filter does not return false negatives for keys that are members of the set (e.g., keys for pre-existing records) and thus old data may remain in and be reliably located in original locations. In one approach a configuration of the Bloom filter may include setting a configurable tolerance that determines how frequently false positive errors are produced. In turn, a degree of compactness of the Bloom filter is dependent upon the configurable tolerance. For example, a higher degree of compactness may be achieved by setting the configurable tolerance to produce or "tolerate" more false positive errors. In practice a very high degree of compactness may be attained since misrecognized data entries may still be reliably located using a function from a preceding era. In other words, the effect of Bloom filter errors may be negligible so a relatively large frequency of errors may be tolerable and therefore very compact configurations of Bloom filters may be employed.

Consider now an example represented by FIG. 3 in which four new records are added to the system after repartitioning. For the purposes of this example, assume the key record b 1 304(1) is configured as a Bloom filter as just described. Keys k1, k3, k3 and k4 are preexisting in the system and will be recognized as being members of the Bloom filter. Accordingly, requests associated with these keys are governed by the partition function p1 206(1). Keys k5 and k6 are found to be not members of the Bloom filter and may be assigned by the partition function p2 206(2) to partition 208(1). Key k7 is also not found in the Bloom filter, and assigned by partition function p2 206(2) to the new partition of database 3. Key k8 is an interesting case, since it is a new key that came about after repartitioning, yet due to the Bloom filter error as discussed above it is misclassified as a member, and hence assigned by partition function p1 206(1) to partition 208(1). As noted though, this does not cause an issue with the integrity of the data or ability to locate data corresponding to key k8 since, the Bloom filter will consistently misrecognize key k8 and therefore reliably route requests for the data.

It is further noted that the repartitioning process described herein may be performed multiple times for successive partition eras. The concepts discussed above in relation to FIGS. 1-3 may be applied to a generalized case that involves multiple repartitioning operations. For example, the former function p1 in the preceding example may be a different composite partition function that corresponds to a previous repartitioning. In other words, the composite partition function established for a current arrangement of partitions may incorporate one or more other composite partition functions for previous arrangements.

Figure 4:
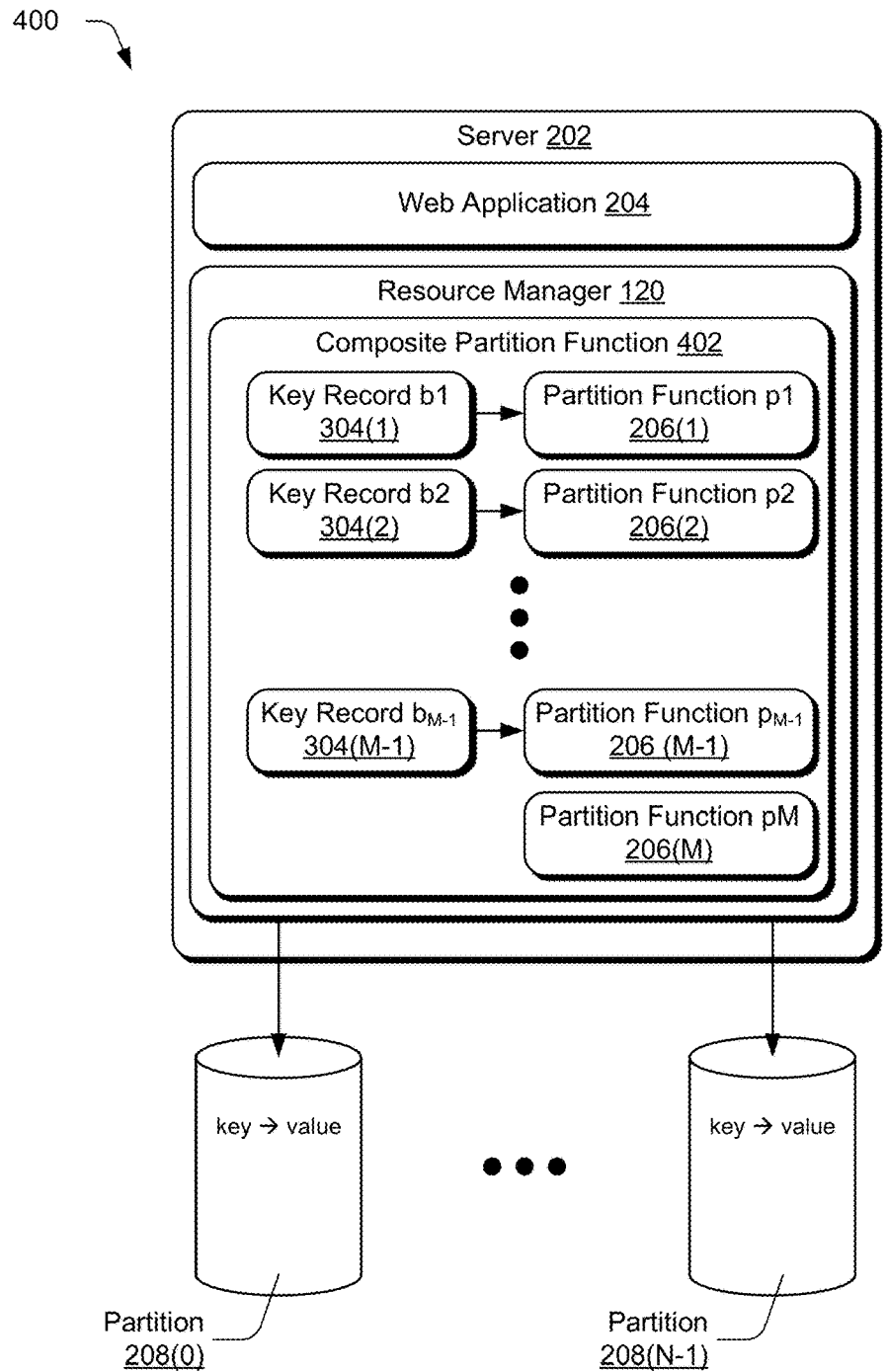
FIG. 4 depicts another example arrangement of partitions for a database system in accordance with one or more implementations.

To further illustrate, consider FIG. 4 which depicts generally at 400 another example arrangement of partitions for a database system in accordance with one or more implementations. In particular, FIG. 4 depicts a generalized case of multiple database partitions (1 through N) and multiple repartitioning operations, each of which does not cause movement of existing data to new locations in the arrangement of partitions. In this example, the database system's lifetime may has a series of successive partition eras (1 through M). Each partition era is associated with a respective partition function 122 that defines how to allocate and locate data for partitions existing for that partition era. Additionally, repartitioning represents the end of a previous partition era and the beginning of a new partition era. Bloom filters or other records of key membership existing at the end of each era may be established as part of the repartitioning. Thus, different partition era may be associated with different records of key membership that may be used to recognize the correct partition functions 122 to apply for data request.

The current petition era M is governed by a composite partition function 402, which is a combination of multiple hash based partition functions p1 . . . pM having references 206(1) . . . 206(M) for each partition era. Additionally, key records b1 . . . $b_{M-1}$ having references 304(1) . . . 304(M-1) are depicted as being established for each of the petition eras prior to the current era. The composite partition function 402 may be configured to check whether a key value is found in any one of the key records and then apply a corresponding partition function when membership in one of the key records is determined. In one approach, the check begins by checking the key record for the oldest era and then progresses through each era from oldest to newest until a match is found. If match is not found in any of the key records, the partition function pM (206(M)) for the current era is selected and applied. In this context, the composite partition function 402 may be expressed as follows:

if k is found in filter bi then set p(k)=pi(k)
else if k is found in filter b2 then set p(k)=$p_2$(k)
. . . continue evaluations for intervening eras
else if k is found in filter $b_{M-1}$ then set p(k)=$p_{M-1}$(k)
else set p(k)=$p_M$(k)

A representation of the example composite partition function 402 in pseudo code is as follows:
repeat for i from 1 to M
if $b_i$(k)==true
return $p_i$(k)
return $p_M$(k)

In accordance with the foregoing discussion, a composite partition function configured to selectively apply partition functions for two or more partition eras may be defined to govern database operations and requests for a current era. In one or more implementations, the composite partition function is configured to provide a substantially equal distribution of new data records across partitions in the current arrangement of partitions. Depending upon the distribution of data that exists at the time of repartitioning, though, distribution of new data may or may not create an acceptable load balance since a newly added partition may have much more storage space available than existing partitions on which old data is already stored.

For example, consider a system with N partitions expanded to N' using partition functions hash(k) mod N and hash(k) mod N'. For the purpose of example, assume N=2 and N'=3 as in the examples of FIGS. 2 and 3, respectively. The corresponding partition functions $p_1$(k)=hash(k) mod 2 and $p_2$(k)=hash(k) mod 3 will place some data onto a new partition but the existing partitions will likely be more loaded due to load conditions at the time of repartitioning. The allocation may therefore result in an unbalanced system.

Accordingly, a rebalancing feature may also be provided in conjunction with the composite partition function techniques discussed herein. In one approach, the rebalancing feature may be provided as an option that may be selectively toggled on or off to skew allocation of new data to new and/or underutilized partitions. In addition or alternatively the resource manager 120 may be configured to automatically implement rebalancing based on factors such as the available capacity of partitions, volume of requests, rate of increase in data, and so forth. Generally, the rebalancing feature may involve using a modified hash function configured to incorporate a skew factor to cause allocation of new data to one or more designated partitions more frequently than to other partitions. For example, a skew factor may cause uneven distribution of data to allocate more data to new partitions added for a reconfigured arrangement than to old partitions existing prior to a repartitioning operation. Various techniques to skew allocation towards particular partition are contemplated. For example, a skew factor may operate to specify a configurable interval at which requests are allocated to a selected partition even if the hash function would indicate a different partition. Thus, the system may be set to automatically allocate requests to the selected partition at the interval (e.g., every third or fourth request). In another approach, the skew factor may be dynamically altered based on relative loads of the partitions such that more requests are allocated to the selected partition initially, but over time the function gradually may return to making even distributions. For example, the skew factor may vary according to a decay function that cause the effect of the skew factor to diminish over time as the selected partition fills up with data.

In another approach, the skew factor is implemented via a modified partition function which uses a slotting concept to bias allocation towards the new partitions in an arrangement. Here, the modified partition function defines multiple slots that are greater in number than the number of partitions. Then, the slots are logically assigned to the partitions such that a new partition or selected partition may be assigned to more than one of the slots. The hash function is configured to return data identifying the slots and allocate data to corresponding partitions. Since the values returned by the hash function span the number of slots, data will be allocated more frequently to a partition that is assigned to more than one of the slots relative to partitions assigned to just one slot.

Figure 5:
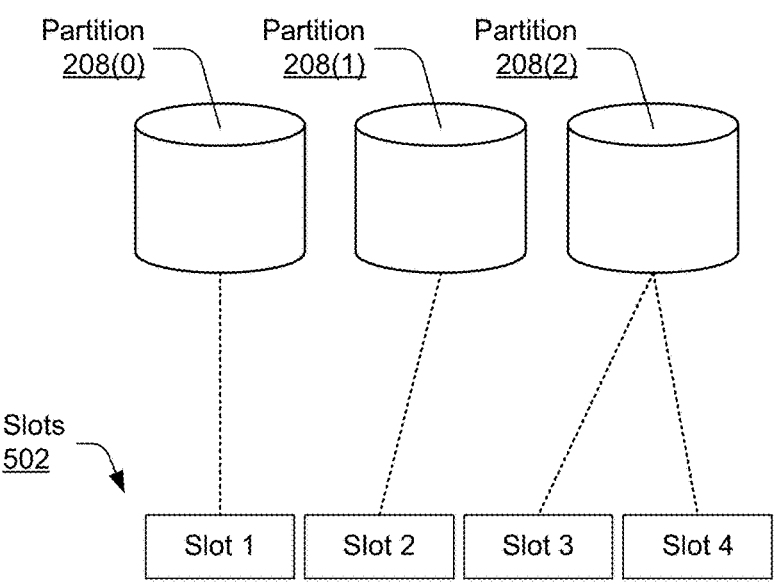
FIG. 5 depicts a representation of assigning partitions to slots in accordance with one or more implementations.

To illustrate, consider FIG. 5 which depicts generally at 500 a representation of assigning partitions to slots in accordance with one or more implementations. Here, the three partitions 208(0), 208(1), 208(2) of the example in FIG. 3 are shown. A number of slots 502 are defined and assigned to the partitions. In this example four slots 502 are assigned to three partitions 208(0), 208(1), 208(2) with each of partition 208(0) and partition 208(1) (e.g., old partitions) being assigned to one slot and partition 208(2) (e.g., the new partition) being assigned to two slots.

For a partition function having the general form p(k)= hash(k) mod N as not above, the modification to implement the bias involves replacing the value of N with the value of S, where S is the number of slots. In addition, data indicative of slot assignments may be maintained to map slot identification returned to the actual partitions. Then, partitioning is computed in two steps:

(1) compute the slot=hash(k) mod S, where S is the number of slots
(2) map the slot to the partition using data indicative of slot assignment As new data arrives, more keys are mapped to the new partition, and accordingly the new partition fills up at a faster rate than old partitions and takes over more of the load. Eventually the system may approach balance between the partitions, at which point continuing to skew towards the newer partition may cause an imbalance to return, this time with the newer partition servicing too much of the load. To address this issue, another repartitioning operation as described herein may be performed, which uses the same partitions but causes a switch from the skewed hash function back to the "standard" function that does not use slots or skew factors. Here the additional repartitioning is performed to change update the partition function without adding more capacity. After this additional repartitioning, the system will be both balanced and expanded.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and the examples of FIGS. 2-5. By way of example, aspects of the procedures may be performed by a suitably configured computing device, such as by one or more server devices associated with a service provider 106 configured to provide resources 118 and/or a resource manager 120.

Functionality, features, and concepts described in relation to the examples of FIGS. 1-5 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Accordingly, individual functionality, features, and concepts described in relation to different example environments, devices, components, and procedures throughout this document may be used in any suitable combinations and are not limited to the particular combinations represented by the enumerated examples.

Figure 6:
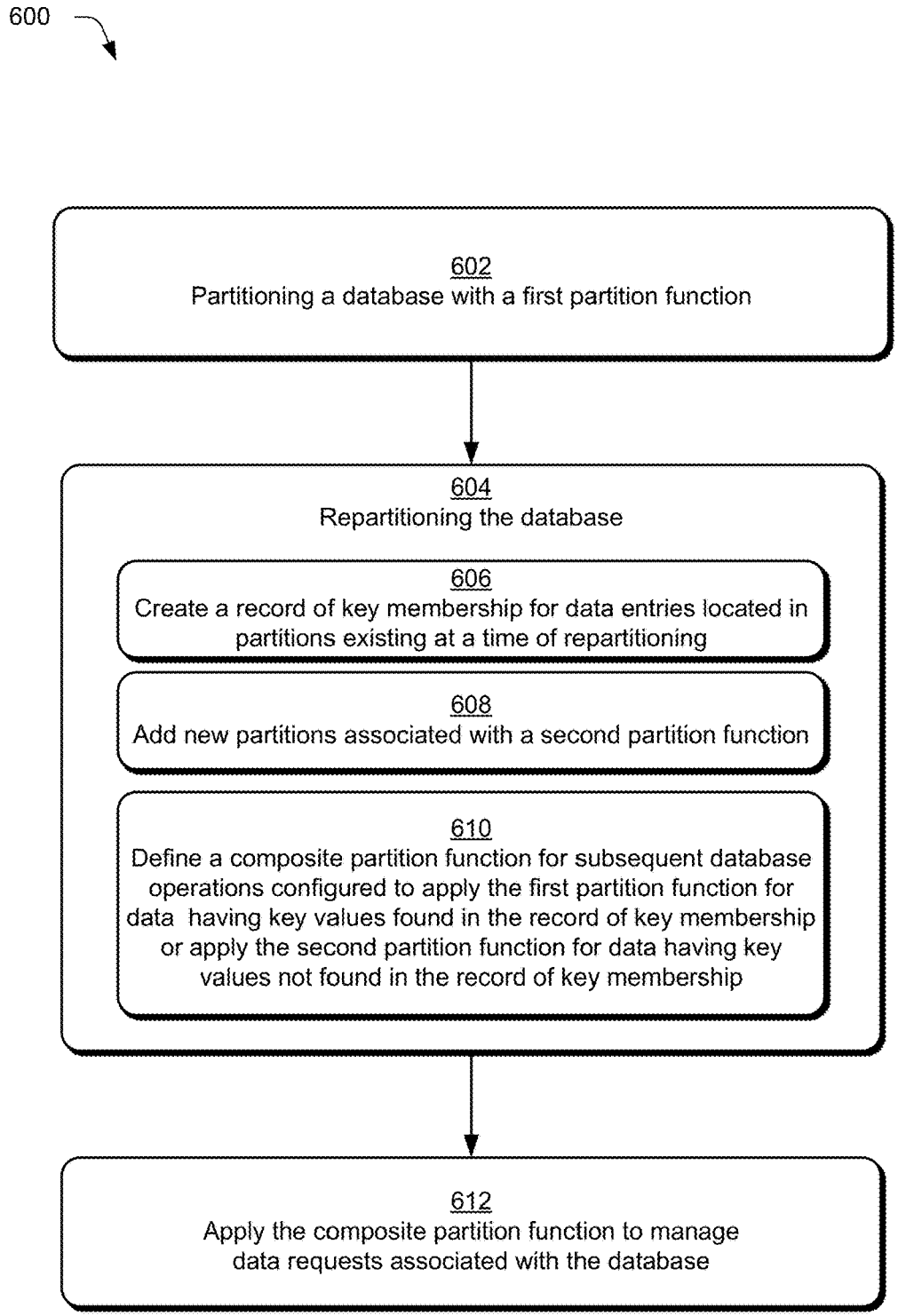
FIG. 6 is a flow diagram depicting an example procedure in which a composite partition function is defined in accordance with one or more implementations.

FIG. 6 is a flow diagram depicting an example procedure 600 in which a composite partition function is defined in accordance with one or more implementations. A database is partitioned with a first partition function (block 602). For example, a resource manager 120 may operate to manage a database 124 associated with resources 118 as discussed previously. The database 124 may be divided into multiple partitions 126, which are defined and/or managed via a partition function 122 implemented by the resource manager 120 or otherwise.

Subsequently, the database is repartitioned (block 604). Repartitioning may be initiated automatically or at the direction of a user. Repartitioning may be performed when the storage capacity of an existing arrangement of partition reaches a threshold level of utilization. In this case, the repartitioning may involve adding more storage capacity. In addition or alternatively, repartitioning may be performed for other reasons such as to rebalance the partitions as discussed herein, change the partition function to achieve a particular allocation goal, undo a skewed hash function to return to a balanced allocation, and so forth.

As part of repartitioning, a record of key membership is created for data entries located in partitions existing at a time of repartitioning (block 606) and one or more new partitions associated with a second partition function are added (608). Various techniques may be used to implement a record of key membership as discussed previously herein. For instance, a Bloom filter or other compressed data structure may be used to record key values or other suitable identifiers associated with data entries located in partitions existing at the time of repartitioning. Further, new partitions may be added to increase storage capacity and create a new arrangement of partitions. As discussed herein, the new arrangement of partitions is associated with a second partition function that accounts for the new partitions and is configured to distribute new data across both the new and old partitions.

Additionally, a composite partition function is defined for subsequent database operations that is configured to apply the first partition function for data having key values found in the record of key membership or otherwise apply the second partition function for data having key values not found in the record of key membership (block 610). Then, the composite partition function is applied to manage data requests associated with the database (block 612). Generally, the composite partition function is configured to utilize a record or records of key membership to map key values/identifiers for data to corresponding partition functions associated with different partition eras. Data requests may then be handled in accordance with corresponding partition functions returned by application of the composite partition function. Using the composite partition function approach discussed herein enables the repartitioning to be performed such that the data entries located in partitions existing at the time of repartitioning keep their respective locations. In other words, the old data is not moved. Various details and examples regarding composite partition functions that may be employed in connection with the procedure 600 were discussed previously in relation to FIGS. 1-5.

FIG. 7 is a flow diagram depicting an example procedure 700 in which a composite partition function is used to route requests for an arrangement of partitions in accordance with one or more implementations. A record of identifiers is established for data corresponding to a first partition function associated with a first arrangement of one or more partitions for a database (block 702). The record of identifiers may be configured as a Bloom filter as described herein or other suitable data structure that may be used to indicate membership of data with respect to an arrangement of one or more partitions (e.g., a partition era). The identifiers may be configured as key values as discussed herein, although other identifiers are also contemplated such as identifying strings, a hash value for data content, and so forth. The first arrangement of one or more partitions may correspond to an initial configuration of a database (e.g., an initial partition era). In addition or alternatively, the first arrangement of one or more partitions may result from repartitioning of an arrangement for a previous era, in which case the first partition function may be configured as a composite function.

The arrangement of partitions for the database is reconfigured to add at least one additional partition to increase storage capacity in a reconfigured arrangement (block 704). Here, repartitioning may occur as discussed previously to add additional capacity to the system. Repartitioning results in a reconfigured arrangement that may have more partitions than the first arrangement. Accordingly, a composite partition function is generated that combines the first partition function associated with a first arrangement and a second partition function associated with the reconfigured arrangement, the composite partition function configured to use the record of identifiers to ascertain whether to apply the first partition function or the second partition function for routing of data requests between the partitions for the database (block 706). Then, data requests are routed using the composite partition function (block 708). As described previously, a composite partition function may be generated that accounts for two or more successive partition eras associated with different arrangements of partitions. The different arrangements may be associated with different individual partition functions and/or different numbers of partitions (although the same number of partitions may be used for two or more eras in some scenarios (e.g., rebalancing). Different eras/arrangements may also be associated with respective records of identifiers that may be employed to recognize membership of data/requests within particular eras. Appropriate partition functions are then mapped to the data/requests and used to route data/request to the corresponding partitions. A composite partition function is configured to combine two or more partition functions associated with successive partition eras with each partition era corresponding to a particular arrangement of partitions for the database. Various additional details and examples regarding composite partition functions that may be employed in connection with the procedure 700 were discussed previously in relation to FIGS. 1-6.

Having considered some example procedures, consider now a discussion of an example system and devices that may be employed to implement aspects of the techniques described herein in one or more implementations.

Example System and Device

Figure 8:
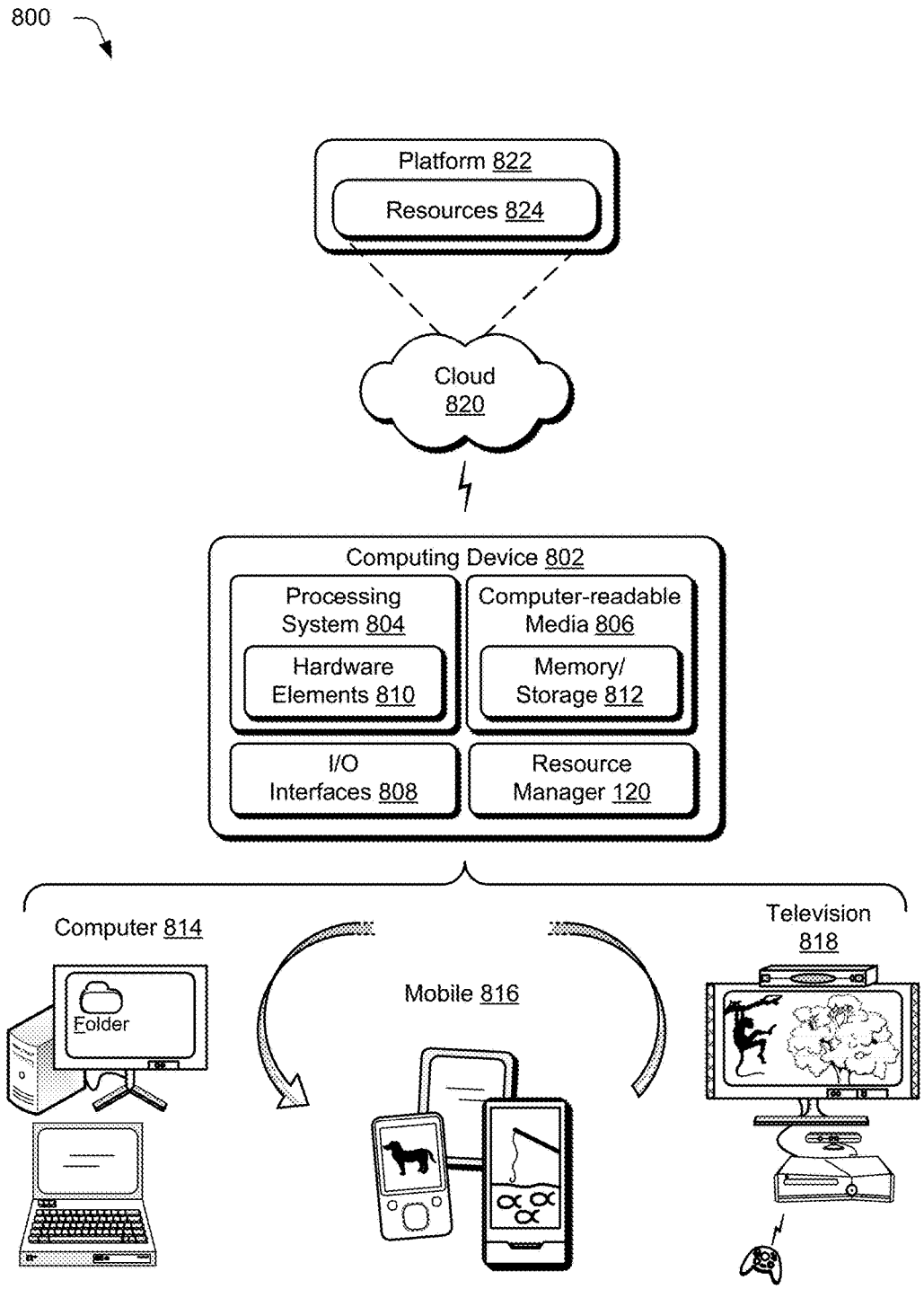
FIG. 8 illustrates an example system having devices and components that may be employed to implement aspects of the techniques described herein.

FIG. 8 illustrates an example system generally at 800 that includes an example computing device 802 that is representative of one or more computing systems and/or devices that may implement the various techniques described herein. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 802, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including applications 112, communication module 114, resource manager 120 and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as a module that is executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This is illustrated through inclusion of the resource manager 120 on the computing device 802. The functionality of the resource manager 120 and other modules may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

Example Implementations

Example implementations of composite partition functions described herein include, but are not limited to, one or any combinations of one or more of the following examples:

A method implemented by a computing device comprising: partitioning a database with a first partition function; and repartitioning the database by: creating a record of key membership for data entries located in partitions existing at a time of repartitioning; adding one or more new partitions associated with a second partition function; defining a composite partition function for subsequent database operations configured to: apply the first partition function for data having key values found in the record of key membership; or apply the second partition function for data having key values not found in the record of key membership.

A method as described above, wherein the repartitioning is performed such that the data entries located in partitions existing at the time of repartitioning keep their respective locations.

A method as described above, wherein the record of key membership is configured to record key values associated with data entries located in the partitions existing at the time of repartitioning.

A method as described above, wherein the record of key membership comprises a compressed data structure configured to identify keys corresponding to data entries existing in the database at the time of repartitioning.

A method as described above, wherein the record of key membership comprises a Bloom filter.

A method as described above, wherein the composite partition function is configured to combine two or more partition functions associated with successive partition eras, each partition era corresponding to a particular arrangement of partitions for the database.

A method as described above, wherein the first partition function and the second partition function are configured as hash functions that when applied to key values for data requests return data identifying partitions of the database corresponding to the key values.

A method as described above, wherein the first partition function comprises a prior composite function established for a previous repartitioning of the database to add additional storage capacity, the composite partition function that is defined configured to apply the prior composite function for data having key values found in the record of key membership and the second partition function for other data.

A method as described above, wherein the combined partition function is configured to bias allocation of data towards placement of new data entries on the new partitions to balance a distribution of data across partitions of the database.

A method as described above, wherein the combined partition function misrecognizes at least some key values for new data entries as being found in the record of key membership, such that data entries associated with misrecognized key values are allocated to and consistently located within the partitions existing at the time of repartitioning.

A computing device comprising: a processing system; and one or more modules that, when executed by the processing system, perform operations for repartitioning of a database to increase storage capacity including: creating a record of key membership for data entries located in partitions of the database existing at the time of repartitioning, partitions of the database existing at a time of repartitioning associated with a first partition function; adding a new partition associated with a second partition function; and defining a composite partition function for handling of subsequent database requests configured to: apply the first partition function for data requests including key values found in the record of key membership; or apply the second partition function for data requests including key values not found in the record of key membership, such that data entries located in partitions existing at the time of repartitioning keep their respective locations in the partitions existing at the time of repartitioning.

The computing device above, wherein the record of key membership is configured as a Bloom filter having bit values set for keys associated with data entries existing at the time of repartitioning to indicate membership for the keys via the Bloom filter.

The computing device of above, wherein: the Bloom filter produces false positive errors according to a configurable tolerance which causes at least a portion of data entries created after repartitioning to be misrecognized and handled using the first partition function, the false positive errors being consistent such that misrecognized data entries are reliably located using the first partition function; and a degree of compactness of the Bloom filter depends upon the configurable tolerance.

The computing above, wherein the composite partition function is configured to combine the second partition function with a plurality of individual partition functions associated with multiple previous operations to repartition the database.

The computing device above, wherein the second partition function is configured to allocate data across partitions of the database existing at the time of repartitioning and the new partition.

A method implemented by a computing device comprising: establishing a record of identifiers for data corresponding to a first partition function associated with a first arrangement of one or more partitions for a database; reconfiguring the arrangement of partitions for the database to add at least one additional partition to increase storage capacity in a reconfigured arrangement; generating a composite partition function that combines the first partition function associated with the first arrangement and a second partition function associated with the reconfigured arrangement, the composite partition function configured to use the record of identifiers to ascertain whether to apply the first partition function or the second partition function for routing of data requests between partitions for the database; and routing data requests using the composite partition function.

A method as described above, wherein routing data requests using the composite partition function comprises for each data request: using the record of identifiers to ascertain whether an identifier associated with the data request is included in the record of identifiers; and when the identifier is included, routing the data request using the first partition function; or when the identifier is not included, routing the data request using the second partition function.

A method as described above, wherein the data requests comprises requests to access, add, or modify data entries in partitions of the database.

A method as described above, wherein data entries existing prior to the reconfiguring are not moved to different locations as a result of the reconfiguring.

A method as described above, wherein the second partition function comprises a modified hash function configured to incorporate a skew factor to cause allocation of new data to the at least one additional partition added for the reconfigured arrangement more frequently than to the one or more partitions existing for the first arrangement.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. A device comprising:
   a processor; and
   a memory in communication with the processor, the memory comprising executable instructions that, when executed by the processor, cause the processor to control the device to perform operations for repartitioning a database to increase a storage capacity, the operations including:
      creating a first membership record of a plurality of first keys corresponding to a plurality of first data entries, respectively, in a first partition associated with a first partition function, wherein the first data entries represent the database existing prior to adding a new partition;
      adding, to the database of the first partition, a second partition associated with a second partition function; and
      implementing a composite partition function to the database such that the first data entries existed in the first partition prior to adding the second partition keep their respective locations in the first partition, wherein, upon implementing the composite partition function, the device is controlled to perform operations of:
         receiving a first request for a first requested data entry in the database;
         applying the first partition function to locate the first requested data entry in the first partition when the first membership record includes a first key corresponding to the first requested data entry; and
         applying the second partition function to locate the first requested data entry in the second partition when the first membership record does not include a first key corresponding to the first requested data entry.

2. The device of claim 1, wherein the first partition function includes mapping the plurality of first keys to the first partition, and the second partition function includes mapping a plurality of second keys to the second partition, the plurality of second keys corresponding to a plurality of second data entries, respectively, added to the second partition.

3. The device of claim 1, the instructions further include instructions that, when executed by the processor, cause the processor to control the device to perform functions of:
   creating a second membership record of a plurality of second keys corresponding to a plurality of second data entries, respectively, added to the second partition;
   adding, to the database of the first and second partitions, a third partition associated with a third partition function;
   receiving a second request for a second requested data entry in the database;
   applying the first partition function when the first membership record includes a first key corresponding to the second requested data entry;
   applying the second partition function when the second membership record includes a second key corresponding to the second requested data entry; and
   applying the third partition function when the first and second membership records do not include any key corresponding to the second requested data entry.

4. The device of claim 3, wherein the third partition function includes mapping a plurality of third keys to the third partition, the plurality of third keys corresponding to a plurality of third data entries, respectively, added to the third partition.

5. The device of claim 1, wherein the instructions further include instructions that, when executed by the processor, cause the processor to control the device to perform functions of rebalancing allocation of new data entries added to the database between the first and second partitions.

6. The device of claim 5, wherein, to rebalance the allocation of the new data entries, the instructions further include instructions that, when executed by the processor, cause the processor to control the device to perform a function of distributing the new data entries based on a skew factor to unevenly allocate the new data entries to one of the first and second partitions more frequently than the other partition.

7. The device of claim 6, wherein the instructions further include instructions that, when executed by the processor, cause the processor to control the device to perform a function of dynamically altering the skew factor based on relative loads of the first and second partitions.

8. The device of claim 5, wherein, to rebalance the allocation of the new data entries, the instructions further include instructions that, when executed by the processor, cause the processor to control the device to perform a function of:
   allocating the new data entries to the first partition at a first interval; and
   allocating the new data entries to the second partition at a second interval that is different from the first interval.

9. A method for repartitioning a database, comprising:
   creating a first membership record of a plurality of first keys corresponding to a plurality of first data entries, respectively, in a first partition associated with a first partition function, wherein the first data entries represent the database existing prior to adding a new partition;
   adding, to the database of the first partition, a second partition associated with a second partition function; and
   implementing a composite partition function to the database such that the first data entries existed in the first partition prior to adding the second partition keep their respective locations in the first partition, wherein implementing the composite partition function comprises:
  receiving a first request for a first requested data entry in the database;
  applying the first partition function to locate the first requested data entry in the first partition when the first membership record includes a first key corresponding to the first requested data entry; and
  applying the second partition function to locate the first requested data entry in the second partition when the first membership record does not include a first key corresponding to the first requested data entry.

10. The method of claim 9, wherein the first partition function includes mapping the plurality of first keys to the first partition, and the second partition function includes mapping a plurality of second keys to the second partition, the plurality of second keys corresponding to a plurality of second data entries, respectively, added to the second partition.

11. The method of claim 9, further comprising:
  creating a second membership record of a plurality of second keys corresponding to a plurality of second data entries, respectively, added to the second partition;
  adding, to the database of the first and second partitions, a third partition associated with a third partition function;
  receiving a second request for a second requested data entry in the database;
  applying the first partition function when the first membership record includes a first key corresponding to the second requested data entry;
  applying the second partition function when the second membership record includes a second key corresponding to the second requested data entry; and
  applying the third partition function when the first and second membership records do not include any key corresponding to the second requested data entry.

12. The method of claim 11, wherein the third partition function includes mapping a plurality of third keys to the third partition, the plurality of third keys corresponding to a plurality of third data entries, respectively, added to the third partition.

13. The method of claim 9, further comprising rebalancing allocation of new data entries added to the database between the first and second partitions.

14. The method of claim 13, wherein rebalancing the allocation of the new data entries comprises distributing the new data entries based on a skew factor to unevenly allocate the new data entries to one of the first and second partitions more frequently than the other partition.

15. The method of claim 14, further comprising dynamically altering the skew factor based on relative loads of the first and second partitions.

16. The method of claim 13, wherein rebalancing the allocation of the new data entries comprises:
  allocating the new data entries to the first partition at a first interval; and
  allocating the new data entries to the second partition at a second interval that is different from the first interval.

17. A device comprising:
a processor; and
a memory in communication with the processor, the memory comprising executable instructions that, when executed by the processor, cause the processor to control the device to perform functions for implementing a composite partition function to a database such that data entries existed in a first partition of the database prior to adding a second partition keep their respective locations in the first partition, the functions comprising:
  creating a membership record of a plurality of keys corresponding to a plurality of data entries, respectively, in the first partition, the data entries representing the database existing prior to adding the second partition;
  receiving a request for a data entry in the database;
  determining whether a key corresponding to the requested data entry is found in the membership record;
  searching the first partition to locate the requested data entry when it is determined that a key corresponding to the requested data entry is found in the membership record; and
  searching the second partition to locate the requested data entry when it is determined that a key corresponding to the requested data entry is not found in the membership record.

18. The device of claim 17, wherein the instructions further include instructions that, when executed by the processor, cause the processor to control the device to perform a function of rebalancing allocation of new data entries added to the database between the first and second partitions.

19. The device of claim 18, wherein, to rebalance the allocation of the new data entries, the instructions further include instructions that, when executed by the processor, cause the processor to control the device to perform a function of distributing the new data entries based on a skew factor to unevenly allocate the new data entries to one of the first and second partitions more frequently than the other partition, the skew factor being dynamically altered based on relative loads of the first and second partitions.

20. The device of claim 18, wherein, to rebalance the allocation of the new data entries, the instructions further include instructions that, when executed by the processor, cause the processor to control the device to perform functions of:
  allocating the new data entries to the first partition at a first interval; and
  allocating the new data entries to the second partition at a second interval that is different from the first interval.

* * * * *